US010875015B2

United States Patent
Zhou et al.

(10) Patent No.: US 10,875,015 B2
(45) Date of Patent: Dec. 29, 2020

(54) METHODS FOR MAKING OXYGEN REDUCTION REACTION CATALYSTS FORMED OF PLATINUM ALLOY NANOPARTICLES EMBEDDED IN POROUS CARBON

(71) Applicants: Toyota Motor Engineering & Manufacturing North America, Inc., Plano, TX (US); Toyota Jidosha Kabushiki Kaisha, Aichi-ken (JP); The University of Akron, Akron, OH (US)

(72) Inventors: Li Qin Zhou, Okemos, MI (US); Kan Huang, Farmington Hills, MI (US); Tomoyuki Nagai, Ann Arbor, MI (US); Hongfei Jia, Ann Arbor, MI (US); Hisao Kato, Aichi (JP); Xiaochen Shen, Akron, OH (US); Zhenmeng Peng, Hudson, OH (US)

(73) Assignees: Toyota Motor Engineering & Manufacturing North America, Inc., Plano, TX (US); Toyota Jidosha Kabushiki Kaisha, Aichi-ken (JP); The University of Akron, Akron, OH (US)

(*) Notice: Subject to any disclaimer, the term of this patent is extended or adjusted under 35 U.S.C. 154(b) by 25 days.

(21) Appl. No.: 16/139,936

(22) Filed: Sep. 24, 2018

(65) Prior Publication Data

US 2020/0094238 A1 Mar. 26, 2020

(51) Int. Cl.
*B01J 37/02* (2006.01)
*B01J 37/18* (2006.01)
(Continued)

(52) U.S. Cl.
CPC ........... *B01J 37/0207* (2013.01); *B01J 21/18* (2013.01); *B01J 23/42* (2013.01); *B01J 35/0046* (2013.01);
(Continued)

(58) Field of Classification Search
CPC . B01J 21/18; B01J 23/42; B01J 23/892; B01J 23/8926; B01J 35/0046; B01J 37/08; B01J 37/18
(Continued)

(56) References Cited

U.S. PATENT DOCUMENTS

| 7,700,521 | B2 * | 4/2010 | Giaquinta | C22C 5/04 |
| | | | | 502/184 |
| 2012/0264598 | A1 * | 10/2012 | Carpenter | B22F 9/24 |
| | | | | 502/326 |

(Continued)

OTHER PUBLICATIONS

Changlin Zhang et al., "Size-dependent oxygen reduction property of octahedral Pt—Ni nanoparticle electrocatalysts." Journal of Materials Chemistry A, 2, pp. 19778-19787. (Year: 2014).*

(Continued)

*Primary Examiner* — Patricia L. Hailey
(74) *Attorney, Agent, or Firm* — Christopher G. Darrow; Darrow Mustafa PC

(57) ABSTRACT

Methods for making porous materials having metal alloy nanoparticles formed therein are described herein. By preparing a porous material and delivering the precursor solutions under vacuum, the metal precursors can be uniformly embedded within the pores of the porous material. Once absorption is complete, the porous material can be heated in the presence of one or more functional gases to reduce the metal precursors to metal alloy nanoparticles, and embed the metal alloy nanoparticles inside of the pores. As such, the metal alloy nanoparticles can be formed within the pores, (Continued)

while avoiding surface wetting and absorption problems which can occur with small pores.

19 Claims, 3 Drawing Sheets

(51) Int. Cl.
*B01J 37/08* (2006.01)
*B01J 21/18* (2006.01)
*B01J 35/04* (2006.01)
*B01J 35/00* (2006.01)
*B01J 23/42* (2006.01)

(52) U.S. Cl.
CPC ........... *B01J 35/04* (2013.01); *B01J 37/0203* (2013.01); *B01J 37/08* (2013.01); *B01J 37/18* (2013.01)

(58) Field of Classification Search
USPC ........ 502/184, 185; 420/456, 457, 466, 468, 420/497; 427/113, 124, 125, 126.1, 427/126.5, 126.6
See application file for complete search history.

(56) References Cited

U.S. PATENT DOCUMENTS

| | | | |
|---|---|---|---|
| 2013/0045866 A1* | 2/2013 | Bele | B22F 1/0018 502/184 |
| 2013/0053239 A1* | 2/2013 | Carpenter | H01M 4/921 502/326 |
| 2013/0133483 A1 | 5/2013 | Yang et al. | |
| 2015/0017570 A1* | 1/2015 | Yang | H01M 4/926 429/523 |
| 2016/0158730 A1 | 6/2016 | Peng | |
| 2018/0214943 A1* | 8/2018 | Xia | B22F 1/0018 |
| 2018/0316023 A1* | 11/2018 | Fang | H01M 4/8657 |

OTHER PUBLICATIONS

Changlin Zhang et al., "Solid-State Chemistry-Enabled Scalable Production of Octahedral Pt—Ni Alloy Electrocatalyst for Oxygen Reduction Reaction." Journal of the American Chemstry Society, 136, pp. 7805-7808 and Supporting Information pp. S1-S14. (Year: 2014).*

Changlin Zhang et al., "Octahedral Pt2CuNi Uniform Alloy Nanoparticle Catalyst with High Activity and Promising Stability for Oxygen Reduction Reaction." ACS Catalysis, 5, pp. 2296-2300; Supporting Information included. (Year: 2015).*

Changlin Zhang et al., "Shape-enhanced ammonia electro-oxidation property of a cubic platinum nanocrystal catalyst prepared by surfactant-free synthesis." Journal of Materials Chemistry A, 1, pp. 14402-14408. (Year: 2013).*

Liu et al., "Controlled synthesis of highly dispersed platinum nanoparticles in ordered mesoporous carbons," Chem. Commun., pp. 3435-3437 (2006).

Zhang et al., "Dynamic traction of lattice-confined platinum atoms into mesoporous carbon matrix for hydrogen evolution reaction," Sci. Adv., 4: eaao6657, pp. 1-9 (2018).

Lei et al., "Highly dispersed platinum supported on nitrogen-containing ordered mesoporous carbon for methanol electrochemical oxidation," Microporous and Mesoporous Materials, vol. 119, Issues 1-3, pp. 30-38 (2009).

Zhao et al., "Ordered Mesoporous Carbon/Titanium Carbide Composites as Support Materials for Platinum Catalysts," Energy Technology, 4, pp. 1-8 (2016).

Lee et al., "Synthesis of heterogeneous catalysts with well shaped platinum particles to control reaction selectivity," PNAS, vol. 105, No. 40, pp. 15241-15246 (2008).

Zhang et al., "Octahedral Pt2CuNi Uniform Alloy Nanoparticle Catalyst with High Activity and Promising Stability for Oxygen Reduction Reaction," ACS Catal. 5, 4, 2296-2300 (2015).

Ambrosio et al., "Platinum catalyst supported on mesoporous carbon for PEMFC," International Journal of Hydrogen Energy, vol. 33, Issue 12, pp. 3142-3145 (2008).

Bruno et al., "Platinum supported on mesoporous carbon as cathode catalyst for direct methanol fuel cells," Journal of Power Sources, vol. 278, pp. 458-463 (2015).

Wu et al., "Ordered Mesoporous Platinum@Graphitic Carbon Embedded Nanophase as a Highly Active, Stable, and Methanol-Tolerant Oxygen Reduction Electrocatalyst," J. Am. Chem. Soc. 134, 4, pp. 2236-2245 (2012).

* cited by examiner

METHODS FOR MAKING OXYGEN REDUCTION REACTION CATALYSTS FORMED OF PLATINUM ALLOY NANOPARTICLES EMBEDDED IN POROUS CARBON

TECHNICAL FIELD

The subject matter described herein generally relates to catalysts and, more particularly, to metal alloy catalysts.

BACKGROUND

Noble metals and their alloys have been widely explored for applications as catalysts in many chemical and electrochemical reactions. Metal and alloy nanoparticles can be deployed as part of a support material for their use as a catalyst. The use of a support material can provide separation and stabilization of the particles, to prevent agglomeration and sintering. The noble metals and their alloys can be involved in catalysis in one or more reactions. Primarily, only surface atoms are involved in catalysis. Therefore, the overall cost of catalysts can be largely related to the amount of precious metal incorporated therein.

SUMMARY

Disclosed herein is methods for forming metal alloy nanoparticles in a porous material. In one implementation, a method for forming platinum alloy nanoparticles into porous carbon is disclosed. The method can include heating a porous carbon material within a chamber, the porous carbon material having one or more pores. The method can further include applying a vacuum to the chamber. The method can further include delivering a platinum precursor solution and a metal precursor solution to the porous carbon material. The method can further include heating the precursor-loaded porous carbon material to a functional temperature. The method can further include delivering a functional gas to the platinum precursor and the metal precursor on the porous carbon material, the platinum precursor and the metal precursor reacting with the functional gas to produce platinum alloy nanoparticles within the one or more pores.

In another implementation, a method for forming platinum alloy particles into porous carbon is disclosed. The method can include removing moisture from a porous carbon material within a chamber, the porous carbon having one or more pores. The method can further include applying a vacuum to the chamber. The method can further include delivering a precursor solution to the porous carbon material, the precursor solution comprising platinum, nickel, and copper. The method can further include purging the chamber using a purge gas. The method can further include heating the precursors-loaded porous carbon material to a functional temperature. The method can further include delivering a functional gas to the precursors-loaded porous carbon material, the precursors reacting with the functional gas to produce octahedral platinum alloy nanoparticles within the one or more pores of the porous carbon material.

In another implementation, a method for forming platinum alloy particles into porous carbon is disclosed. The method can further include heating a porous carbon material in a chamber to a temperature of from 150° C. to 300° C., for a time period of from 1 hour to 24 hours, in an atmosphere comprising air, Ar, $N_2$, $O_2$, or combinations thereof, the porous carbon having one or more pores. The method can further include reducing pressure within the chamber to less than 500 millibars. The method can further include delivering a precursor solution to the porous carbon material, the precursor solution comprising platinum$(acac)_2$, copper$(acac)_2$, and nickel$(acac)_2$, dissolved in a volatile solvent. The method can further include purging the chamber using a purge gas. The method can further include heating the precursors-loaded porous carbon material to a temperature from 150° C. to 300° C. for a period of from 1 hour to 5 hours. The method can further include delivering a functional gas to the precursors-loaded porous carbon material, the precursors reacting with the functional gas to form octahedral platinum alloy nanoparticles within the one or more pores.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

Figure 1:
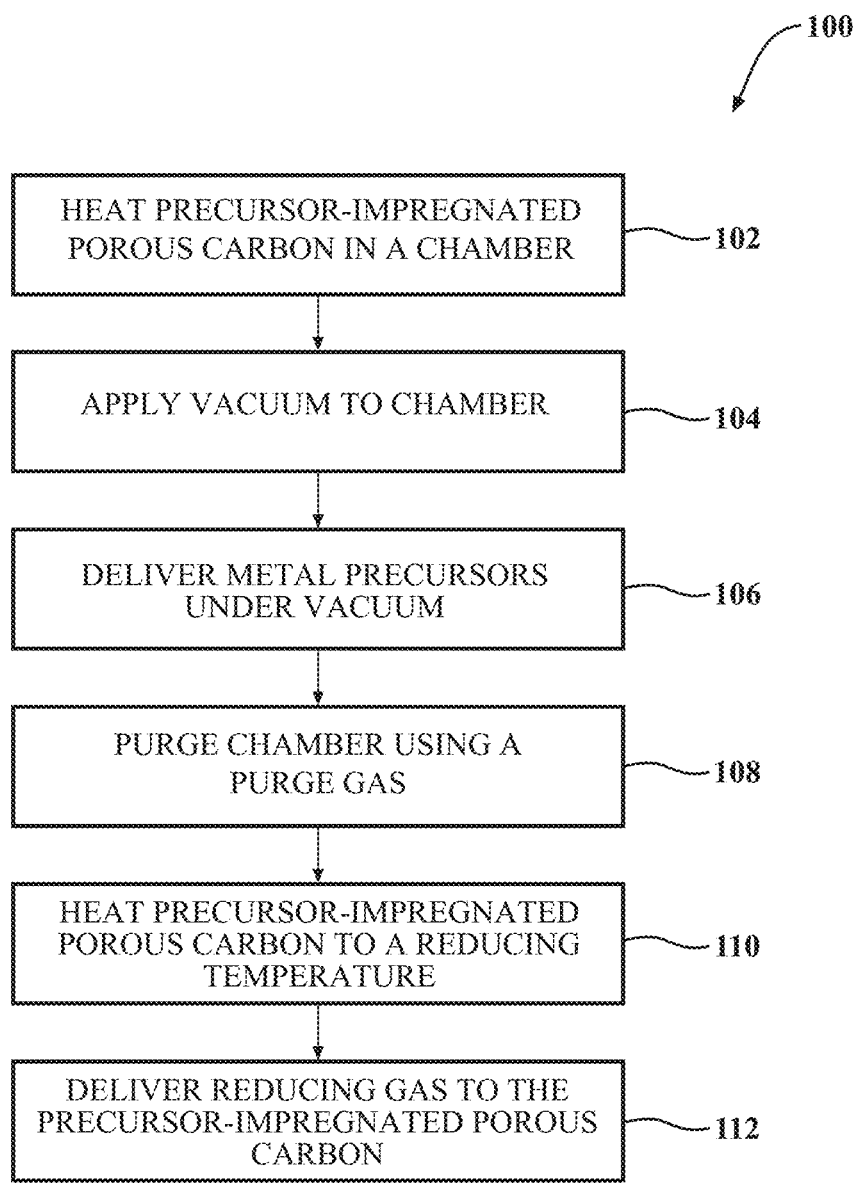
FIG. 1 is a block diagram of a method for synthesizing platinum-containing mesoporous carbon (MPC) materials, according to one or more implementations.

To provide context, noble metal alloy nanoparticles, such as platinum alloy nanoparticles, represent a new frontier of advanced fuel cell (FC) catalyst materials. "Catalyst," as used herein, is a substance which alters the rate of a chemical reaction. Catalysts participate in a reaction in a cyclic fashion, such that the catalyst is not consumed by the reaction. Platinum alloys, such as octahedral platinum alloys, have surface facets that can provide for high activity. However, scale-up preparation of said platinum alloy catalysts remains challenging. Production difficulties for said catalysts include maintaining consistency in shape, consistency in size, and composition control.

Further and with regards to FC applications, the durability of shape-controlled catalysts in vehicle applications is another challenge to overcome. The sharp edges of the nanoparticles are one of the main causes for instability of the shape-controlled platinum alloy. The sharp edges can lead to the easy detachment of the particles from carbon support during electrochemical cycling.

Metal alloy nanoparticles with specific morphologies can exhibit improved catalytic properties, such as activity, selectivity, and durability, in many reactions. In manipulating the morphology of metal alloy nanoparticles, the catalytic properties of the catalyst can be improved. Further, by producing alloys, the amount of noble metal usage in some metal alloys can be decreased. A variety of methods have been explored for preparing noble metal alloy catalysts with specific morphologies. In some implementations, an active metal precursor is dissolved in an aqueous or organic solution. Then, the reactant solution is added to a catalyst support containing a pore volume equal to the volume of the reactant solution that is added. Capillary action can then draw the solution into the pores. Solution can be added in excess of the support pore volume, to cause the solution transport to change from a capillary action process to a diffusion process. The catalyst can then be dried to evaporate the volatile components within the porous material, depositing the metal on the catalyst surface. The method described herein allows for forming metal alloy nanoparticles, such as platinum-containing nanoparticles inside the pores of the porous carbon support, such as MPC, to prevent the nanoparticle migration and enhance durability.

Embodiments described herein relate to a method for forming metal alloy nanoparticles, such as octahedral platinum-nickel-copper (PtNiCu) nanoparticles, into a porous material, such as porous carbon materials, for example, a MPC support. The implementations described herein can further be applied to forming a variety of other types of nanoparticles into a variety of porous structures. The implementations disclosed herein can include vacuum impregnation of the porous material. "Vacuum impregnation," as used herein, refers to impregnating the porous material (e.g., the porous carbon material) using the metal precursors while under vacuum. Vacuum impregnation can provide the benefit of effectively loading the metal precursors into the MPC pores, speeding the absorption process, and avoiding surface wetting problems inherent in microporous or mesoporous structures.

Further, vacuum impregnation can allow for better surface interaction between the metal precursors and the porous material. The implementations disclosed herein can further include reducing the impregnated metal precursors into shaped alloy nanoparticles using a reducing gas atmosphere. The reduction in situ of the metal precursors can allow the nanoparticles to form and embed in the walls of the porous structure, reducing nanoparticle migration post-synthesis. The implementations disclosed herein are more clearly described with reference to the figures below.

FIG. 1 is a block diagram of a method 100 for synthesizing platinum-containing MPC materials, according to one or more implementations. The methods described herein include vacuum impregnation of a porous carbon material with a plurality of metal precursors. Once impregnated with the metal precursors, the porous carbon material is heated, and the metal precursors are reduced with reducing gases to produce the metal alloy nanoparticles. The method 100 can include removing moisture from a porous carbon material within a chamber, at 102. A vacuum can then be applied to the chamber, at 104. A precursor solution can then be delivered to the porous carbon material, at 106. The chamber can then be purged using a purge gas, at 108. The MPC material can then be heated to a reducing temperature, at 110. Then, a reducing gas can be delivered to the MPC material, at 112.

The method 100 can include removing moisture from a porous material within a chamber, at 102. The method 100, as disclosed herein, includes a designated amount of a porous material, such as a porous carbon material, being positioned within a chamber for formation of one or more metal alloy materials. "Porous material" refers to a material having pores, such as cavities, channels or interstices. "Pore" refers to an opening, depression, or a tunnel in a carbon material, such as, for example, in MPC material. A pore can be a single tunnel or connected to other tunnels in a continuous network throughout the structure. "Porosity" refers to the fraction of the volume of voids over the total volume of the surface. In one implementation, the porous material is a MPC material, a microporous carbon material, or others.

The porous materials can have a pore structure capable of high surface area for metal catalyst exposure. "Pore structure," as used herein, generally refers to the surface layout of the internal pores within a material, such as a MPC material. Components of the pore structure include pore size, pore volume, surface area, density, pore size distribution, and pore length. Generally, the pore structure of the porous carbon materials, such as MPC or microporous carbon, comprise a combination of mesopores and micropores where the predominant pore type determines the material type. "Mesopore," as used herein, generally refers to pores having a diameter between two (2) nanometers and about 50 nanometers while the term "micropore" refers to pores having a diameter less than two (2) nanometers. MPC materials can have greater than 50% of their total pore volume in mesopores, while microporous carbon materials comprise greater than 50% of their total pore volume in micropores.

For example, in certain implementations, the porous material can include a mesoporous pore structure. In other implementations, the porous material is predominately microporous. In yet further implementations, the porous material can include a blend of micropores and mesopores, in positions, quantities, and organizations as desired. The pore structure can allow for incorporation of metal precursors (e.g., for metal alloy catalysts) while also allowing for desired exposure of reactants. In certain implementations, the porous materials are ultrapure, which can provide enhanced elimination of side reactions associated with unwanted impurities. "Ultrapure" refers to a substance having an impurity content of less than 0.050%, such as a porous carbon material having an impurity content of less than 0.050% (i.e., 500 ppm). As such, the porous materials can provide an adequate structure for the formation of metal alloy nanoparticles.

The chamber can be capable of removing moisture from the porous material. In one or more implementations, the chamber can be a furnace, a desiccator, a vacuum chamber, or others capable of removing moisture. The chamber can be sealed to an exterior environment. Further, the chamber can be multifunctional, such that one or more further steps can be performed in the same chamber. In further implementations, the chamber performs a single function. In implementations which use more than one chamber, the chamber can further include capability or configuration to transfer the porous material through a sealed environment, such as to prevent contamination during transfer between chambers.

The porous material can be held in the chamber in a controlled atmosphere. The atmosphere can include argon (Ar), nitrogen ($N_2$), oxygen ($O_2$), carbon dioxide ($CO_2$), other atmospheric gases, other inert gases, or combinations thereof. The porous material can be maintained at a pretreatment dwell temperature. "Dwell temperature" refers to the relatively constant and stable temperature (i.e., neither increasing nor decreasing the temperature) of the chamber during a portion of a process. The pretreatment dwell temperature can be selected such that the porous material can be substantially dry within the time frame desired, without damaging the porous material, one or more components on the porous material, or one or more components of the chamber. In one example, the pretreatment dwell temperature can be in a range of from about 100° C. to about 300° C. The pretreatment dwell temperature can be set with respect to a ramping rate. "Ramping rate," as used herein, describes the rate used to heat the catalyst precursor from room temperature to the designated dwell temperature. The ramping rate is provided as a function of temperature over a period of time.

The pretreatment time frame can be long enough to substantially remove moisture from the porous carbon material. In one example, the dwell temperature can be maintained for a pretreatment time frame, such as in a range of from about 1 hour to about 24 hours. The pretreatment time frame can be longer or shorter, as suited to dwell temperature and the moisture of the porous carbon material. As used herein, the term "substantially" includes exactly the term it modifies and slight variations therefrom. Thus, the term "substantially remove" means exactly remove and slight variations therefrom. In this particular example, slight variations therefrom can include within normal manufacturing or preparations tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

The preparation of different metal alloy nanoparticles with different morphology, composition, and size can be controlled through different synthetic parameters, including the type of functional gas atmosphere, the total pressure/partial pressure of the gases, the ramping rate for heating the materials, the reduction temperature, and the reduction time. Each of these parameters can be controlled, respective to the parameter type, by adjusting one or more of the gas type or pressure using flow meters and/or valves or adjusting one or more of the dwell temperatures, time frames, or ramping rate using the reduction furnace.

A vacuum can be applied to the chamber, at 104. The vacuum can be delivered to the chamber using a vacuum supply source, such as a pump fluidly connected to the chamber. The vacuum supply source can reduce the atmospheric pressure within the chamber to a pressure which is in a range of less than about one (1) bar, such as a range of less than about 500 millibars. In one implementation, the pressure within the chamber can be in the range of from about 500 millibars to about 0.01 millibar. In one or more implementations, the temperature of the chamber can be in a range of from about 20° C. to about 100° C. The vacuum can be maintained or recreated during one or more elements of the method described herein. The vacuum applied between steps can vary, such as within the ranges described herein, in a continuous or non-continuous fashion.

A precursor solution can be delivered to the porous material, at 106. In one implementation, the addition of the precursor solution to the porous substrate under vacuum is referred to as a "vacuum impregnation." "Vacuum impregnation," as used herein, refers to the uniform distribution of the metal precursors onto and/or into the exposed surface of the substrate. The metal precursors can be dissolved into a solvent to create the precursor solution. The precursor solution can be used to impregnate the metal precursors onto the porous material. "Solvent" refers to a substance which dissolves or suspends reactants (e.g., metal precursors) and provides a medium in which a reaction may occur. Examples of solvents which can be used in the preparation of metal precursors can include but are not limited, to organic compounds having a low solvent molar volume for active-species solubility, and a high Hansen polarity for conductivity. Examples of solvents usable with implementations described herein can include water, ethanol, acetone, acetonitrile, acetylacetone (acac), dimethylformamide, methanol, propanol, hexane, toluene, chloroform, dimethyl ether, tetrahydrofuran, dimethyl sulfoxide, and mixtures thereof. Suitable solvents will be apparent based on the chosen metal precursors. Solvents used herein can have limited or no reaction with either the metal precursors or the porous material. Further, the solvents can help to disperse the metal precursors onto the porous carbon materials.

The precursor solution can include one or more metal precursors. The metal precursors can be first dissolved in a solvent, before vacuum impregnation onto support materials. The solvent and vacuum impregnation can result in a uniform distribution of metal precursor molecules on the surface of the porous carbon materials. The metal precursors can be selected in light of the desired constituents, such as platinum, copper, palladium, nickel, or others. In one implementation, the metal precursors include platinum, copper, and nickel. In one or more implementations, the precursor solution can be referred to as a function of the dissolved metal precursor (e.g., platinum precursor solution, copper precursor solution, metal precursor solution, etc.). The precursor solution can be delivered as components or mixed, where the metal precursor is dissolved in a solvent, such as chloroform, acetone, toluene. In one example, the precursor solution can include platinum (II) acetylacetonate, ($Pt(acac)_2$), copper (II) acetylacetonate, ($Cu(acac)_2$), and nickel (II) acetylacetonate, ($Ni(acac)_2$) dissolved in a volatile solvent.

Then, the precursor solution is added to the porous material to distribute the metal precursor across the exposed surface of the porous material. The precursor solution can be delivered at a controlled speed and in the presence of agitation (e.g., vigorous stirring). The porous catalyst mixture can be maintained under vacuum and/or continuous stirring for a suitable period of time to ensure absorption and adsorption of the precursor solution into the porous material. The vacuum reduces pressure, allowing for both better surface wetting of the porous material and evacuation of volatile chemicals. The vacuum can create a dry low-pressure atmosphere around the porous material, thus allowing the solvent to evaporate more readily and leaving behind the metal precursors. Thus, the vacuum dries the saturated porous material, which includes the porous material and the metal precursor adsorbed thereon and/or absorbed therein. As used herein, "saturated" indicates some level of absorbance of a first substance into a second substance. Saturation can include partial saturation or complete saturation. In this example, the saturated porous material is the second substance, and the precursor solution is the first substance.

After mixing and drying the saturated porous material under the vacuum condition, the chamber, including the saturated porous material, can be purged using a purge gas, at 108. The purge gas can then be delivered to clear the chamber. The purge gas can include an inert gas. The inert gas can be a gas that is not reactive with the exposed elements within the chamber, such as the porous substrate, the precursor solutions, the surfaces of the chamber itself, and others. The inert gas usable with implementations described herein can include noble gases, such as Ar, He, Xe, and the like, or non-reactive gases, such as $N_2$. The inert gas may be supplied to the chamber at a flow rate of from about one (1) sccm to about 1000 sccm. The end point can be determined based on clearance from the chamber of volatile chemicals, specific time frame or others as desired.

The porous material can be heated to a functional temperature, at 110. The reducing of the reactants can include heating the saturated porous material at the designated ramping rate to a functional dwell temperature. The chamber can be heated to functional dwell temperature. The functional dwell temperature can be a dwell temperature at which the metal precursor reaction can occur. In one implementation, the functional dwell temperature can be in a range of from about 150° C. to about 300° C. The designated ramping rate can be a ramping rate which achieves the desired reaction, including the morphology of the resulting particles, without damaging the porous material or the metal precursors. In one implementation, the designated ramping rate can be a range from about 1° C./min to about 20° C./min. The functional dwell temperature can be maintained in the chamber for the functional time frame, based at least on the desire, the metal precursor being reduced, specific particle shape and size, or others. In one implementation, the functional time frame can be a range from about one (1) hours to about five (5) h for metal precursor reduction.

Before, during, or after the heating to the functional dwell temperature, a functional gas can be delivered to the porous material, at 112. The reactants on the porous material can then be reduced in the one or more functional gases. In one or more implementations, the designated dwell temperature can be maintained for the designated reaction time. During this process, the functional gases facilitate the transportation of metal precursors to their growing sites and the reduction of the metal precursors into their respective metal or alloys as the case may be based on the precursors employed.

The functional gases preferentially adsorb to certain surfaces of growing metal and alloy nanoparticles, altering the surface plane growth rate and confining their growth into particular morphologies. For instance, if the functional gases adsorb preferentially to the (100) planes, then the grown particles have a cubic morphology. If the functional gases adsorb preferentially to the (111) planes, the grown particles have either a tetrahedral or an octahedral morphology. The many different synthetic parameters, including the type of functional gas atmosphere, the total pressure/partial pressure of the gases, the ramping rate for heating the materials, the reduction temperature, and the reduction time can influence the reduction rate of the metal precursors and the nucleation rate of the reduced metals. These influences consequently affect the growth rate of metal alloy nanoparticles and thus their final particle size.

Functional gases, such as CO, $NH_3$, NO, and $C_2H_2$, can be used. The functional gases they have preferential adsorption to metal planes which can be used to control the shape of the metal precursors. The functional gas atmosphere can be a pure gas, such as one listed above, or it can also be a mixture of one of those gases with hydrogen and/or inert gases. If multiple gases are used, partial pressures of each gas can be adjusted individually, or the total pressure of all the gases can be adjusted. The method described here be carried out using only functional gases. Functional gases can be easily removed from the produced materials once the process is complete.

In one or more implementations, both CO and $H_2$ gases are used for the functional gases. CO and $H_2$ gases can be applied differentially to control the final morphology of the metal alloy nanoparticles. In one example, CO and $H_2$ gases can be used, in varying concentrations, to reduce the noble metal platinum. In one implementation, a gas mixture of $H_2$ and CO can be delivered at a partial pressure ratio being in range of greater than 1:100 (e.g., one (1) part $H_2$ to 100 parts CO) $H_2$ to CO gas, such as a range of greater than 1:50 $H_2$ to CO gas, where greater refers to increasing concentrations of $H_2$ as compared to CO gas. In another implementation, a gas mixture of $H_2$ and CO can be delivered at partial pressure ratio being in the range of from about 1:100 (i.e., one (1) part $H_2$ to 100 parts CO) to about 1:1 of $H_2$ to CO gas. The functional gases can be delivered at a volumetric flow rate in a range of from about ten (10) sccm to about 1000 sccm, such as in a range of from about 100 sccm to about 500 sccm. The flow rate, in sccm, of the functional gases can be based on the current temperature of the chamber or room temperature. The functional gas can further include a carrier gas. The career gas can be an inert gas, as described above, such that flow rate can be maintained while limiting the available reactants for reducing the metal precursors.

Pure CO gas can form platinum particles that contain a mixture of polyhedral, irregular, and cubic shapes. Pure $H_2$ gas can form platinum particles that contain a mixture of spherical and irregular platinum particles, with large particles (e.g., larger than 20 nm) and small particles (e.g., smaller than 10 nm) coexisting together. In implementations described herein, $H_2$ gas can be used to facilitate reduction of the platinum precursors on the carbon support. As well, CO gas can be used to confine growth of platinum nuclei into cubes, due to its preferential chemisorption to platinum surfaces. Thus, CO and $H_2$ gases can be used together to control platinum nanoparticle size and morphology as desired, for porous materials described herein. In one or more implementations, the parameters described above can be applied to produce platinum alloy nanoparticles, such as octahedral platinum alloy nanoparticles. In one example, the octahedral platinum alloy nanoparticles are octahedral PtNiCu nanoparticles. The precursors can react with the functional gas to produce octahedral platinum alloy nanoparticles within the pores of the MPC material.

Thus, the method disclosed herein teaches the formation of octahedral platinum formed in a porous material network, such as MPC materials as described herein. By creating a vacuum, the precursors can be absorbed and adsorbed into the porous material. Thus, the porous material can securely embed and surround the metal alloy nanoparticles, preventing dislodgement or migration of the material. As well, the formations described herein, such as octahedral platinum formed in a MPC material, can provide catalytic activity with lower noble metal requirements.

Figure 2:
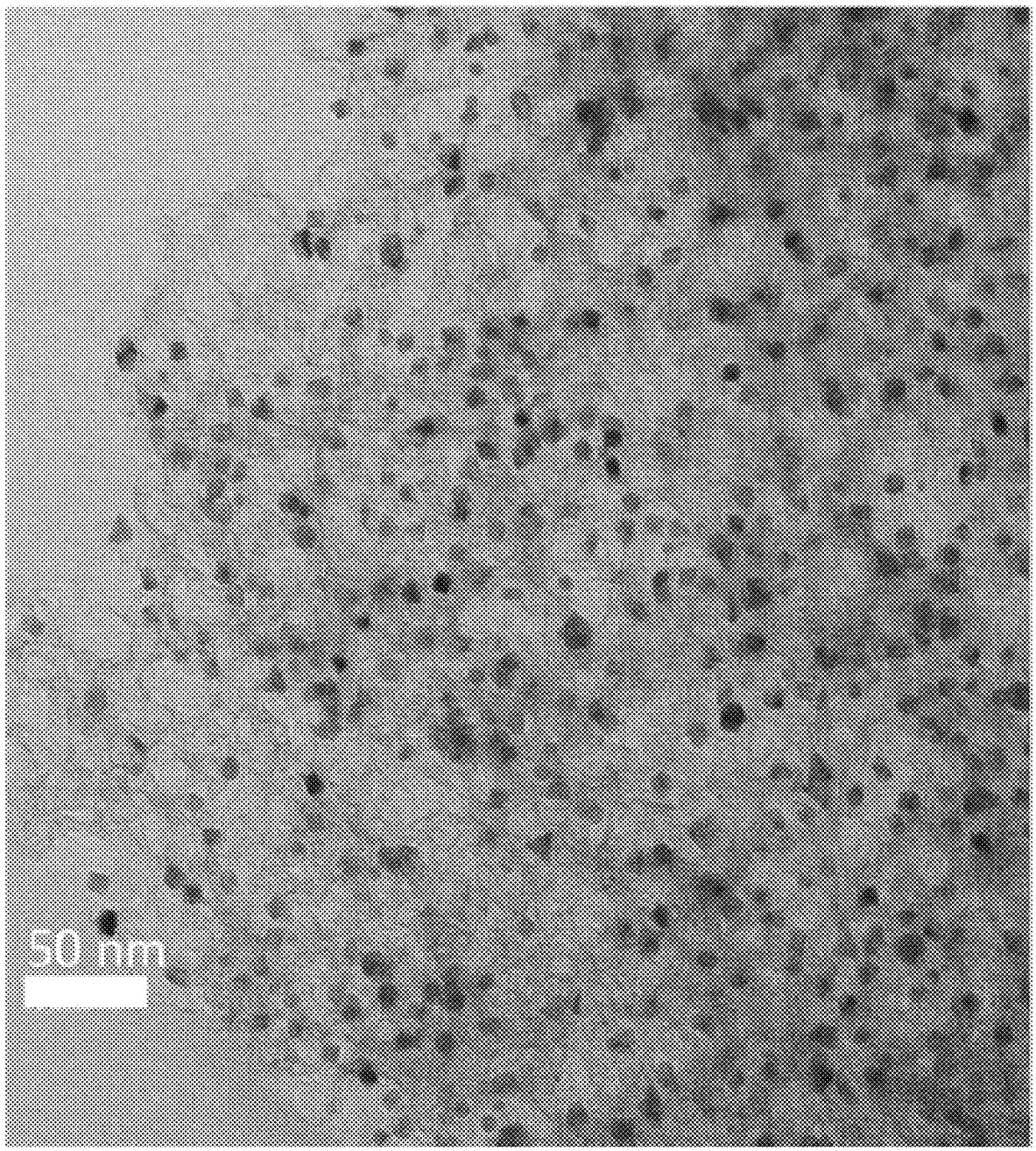
FIG. 2 is a transmission electron microscopy (TEM) image of platinum-containing nanoparticles formed in a MPC material, according to one or more implementations.

FIG. 2 shows a TEM image of PtNiCu nanoparticles formed in MPC material, prepared according to the method of FIG. 1. The morphology of the PtNiCu/MPC materials (i.e., MPC materials with PtNiCu nanoparticles embedded in the pores) synthesized is shown here. Based on the vacuum impregnation technique described here, the PtNiCu nanoparticles are well sited in the pores of the MPC material. As well, a significant portion of the PtNiCu nanoparticles is seen in a rhombic shape-octahedral structure with substantially uniform nanoparticle sizes of less than or equal to 5 nm. Thus, TEM imaging supports the formation and/or encapsulation of octahedral PtNiCu nanoparticles.

Figure 3:
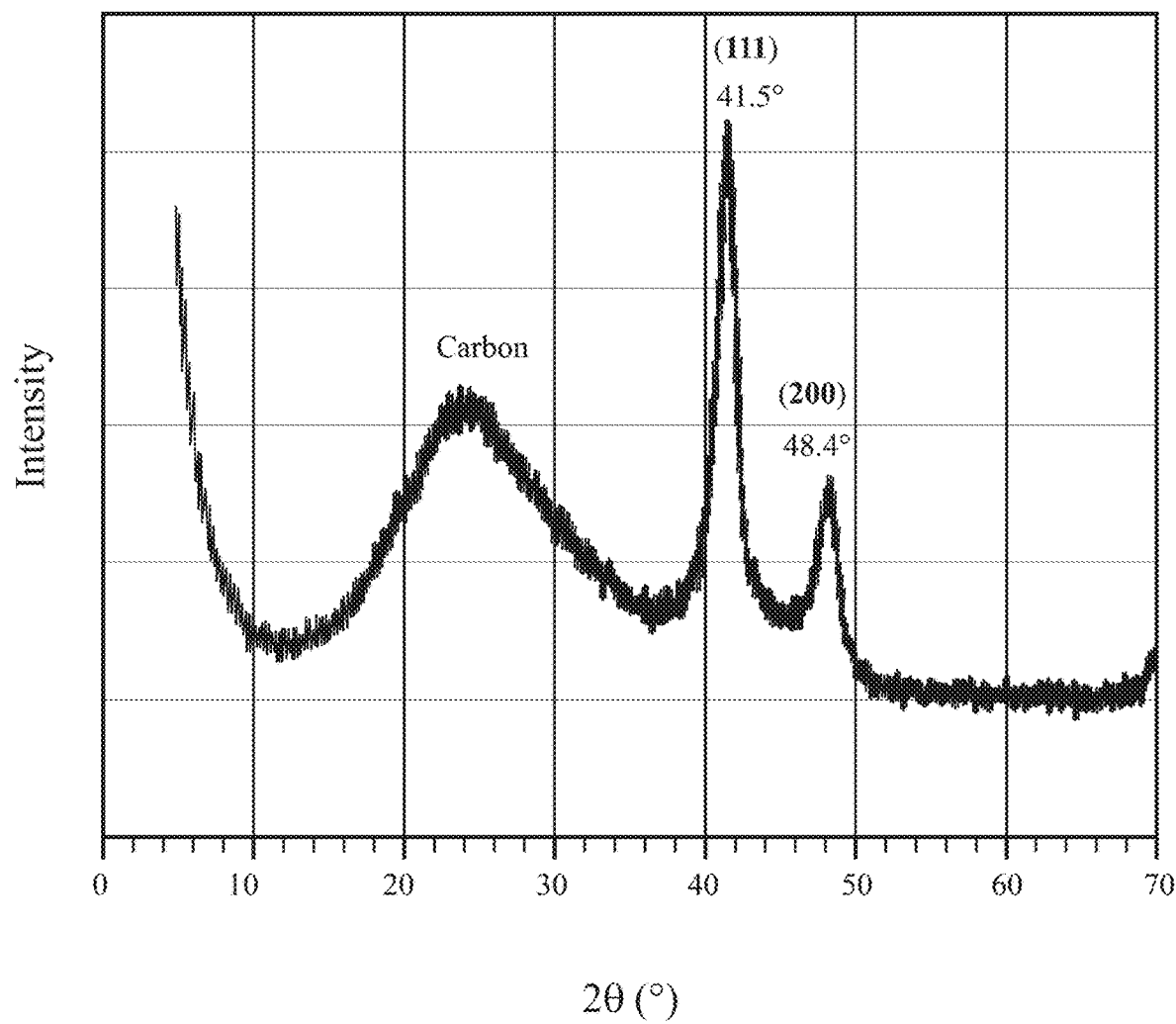
FIG. 3 is an X-ray diffraction (XRD) characterization pattern of PtNiCu nanoparticles, according to one or more implementations.

FIG. 3 is an XRD characterization result for the PtNiCu/MPC materials, prepared according to the method described with reference to FIG. 1. Referring to FIG. 1, the plot shows diffraction peaks at 41.5° and 48.4°, which are assigned to the PtCuNi composition. Given that one set of the diffraction peaks are present, the PtCuNi nanoparticles are understood to have had a substantially uniform particle composition. The associated peak positions have significant shifts (a shift of about 1.7° and about 2.1°, respectively) compared to reference Pt (39.76° for (111) peak and 46.24° for (200)

peak), which is an indication of Pt alloy formation. Thus, XRD characterization supports the formation of substantially uniform PtNiCu alloy nanoparticles.

EXAMPLES

Example 1

50 g of MPC material was thermally treated in a first chamber, using an air atmosphere and a dwell temperature at 300° C. overnight, for removing moisture before use. The MPC material was then added into a second chamber which was evacuated using a vacuum device, to remove the air in the pores of the MPC material. A precursor solution was prepared, including $Pt(acac)_2$, $Ni(acac)_2$, and $Cu(acac)_2$ dissolved in chloroform. The precursor solution was then injected into the second chamber, to be absorbed by the MPC material under the vacuum condition and vigorous stirring. The support material rapidly absorbed the precursor solution, suggesting effective impregnation of the precursors into the material pores.

After the impregnation, the saturated MPC material was then purged by $N_2$ flow for 20 minutes. The saturated MPC material was reduced by being heated at a ramping rate of 15° C./min to a dwell temperature of about 200° C. The dwell temperature was maintained for a time period of 1 hour. A functional gas, including $H_2$ gas and CO gas, was delivered to the chamber at a flow rate of 5 $cm^3$/min for the $H_2$ gas and a flow rate of 120 $cm^3$/min for the CO gas (ratio of 1:24 $H_2$ gas to CO gas), to produce a PtNiCu/MPC material. At the end of the time frame, the atmosphere was switched back to the inert gas, $N_2$, to purge the chamber of reactants and volatile chemicals. The material was cooled down to room temperature after the reaction was complete.

Example 2

50 g of MPC material was thermally treated in a first chamber, using an inert gas atmosphere and a dwell temperature at 200° C. overnight. The chamber with the MPC material was then evacuated using a vacuum device. A precursor solution was prepared, including $Pt(acac)_2$, $Ni(acac)_2$, and $Cu(acac)_2$ dissolved in chloroform. The precursor solution was then injected into the chamber under the vacuum condition and vigorous stirring to impregnate the precursors into the material pores.

After the impregnation, the saturated MPC material was then purged by $N_2$ flow for 20 minutes. The saturated MPC material was reduced by being heated at a ramping rate of 10° C./min to a dwell temperature of about 200° C. The dwell temperature was maintained for a time period of 4 hours. A functional gas, including $H_2$ gas and CO gas, was delivered to the chamber at a flow rate of 30 $cm^3$/min for the $H_2$ gas and a flow rate of 60 $cm^3$/min for the CO gas (ratio of 1:2 $H_2$ gas to CO gas), to produce a PtNiCu/MPC material. At the end of the time frame, the atmosphere was switched back to the inert gas, $N_2$. The material was then cooled down to room temperature.

In the following description, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-8, but the implementations are not limited to the illustrated structure or application.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one implementation or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

What is claimed is:

1. A method for forming platinum alloy nanoparticles within pores of a porous carbon material, the method comprising:
heating a porous carbon material within a chamber;
applying a vacuum to the chamber to create evacuated pores in the porous carbon material;
impregnating the evacuated pores of the porous carbon material with a metal precursor solution comprising a platinum salt and at least one other metal salt; and
reducing metal ions from the platinum salt and the at least one other metal salt in the metal precursor solution to form platinum alloy nanoparticles within the pores of the porous carbon material.

2. The method of claim 1, further comprising delivering a purge gas into the chamber prior to the step of reducing metal ions, the purge gas being a gas that is inert with respect to the metal precursor solution.

3. The method of claim 1, wherein the at least one other metal salt comprises a salt of copper, nickel, or a combination thereof.

4. The method of claim 1, wherein applying the vacuum creates a pressure within the chamber of less than 500 millibars.

5. The method of claim 1, wherein the porous carbon material is a mesoporous carbon.

6. The method of claim 1, wherein the step of reducing metal ions comprises delivering a functional gas into the chamber at a partial pressure ratio of from 1:100 to 1:1 of $H_2$ to CO, and a volumetric flow rate of from 10 sccm to 1000 sccm.

7. The method of claim 1, wherein the step of reducing metal ions comprises heating the porous carbon material having metal ions from the platinum salt and the at least one other metal salt to a functional temperature of from 150° C. to 300° C.

8. The method of claim 7, further comprising maintaining the functional temperature for a time period of from 1 hour to 5 hours in the presence of the functional gas a functional gas.

9. A method for forming platinum alloy particles within pores of a porous carbon material, the method comprising:
removing moisture from a porous carbon material within a chamber;
applying a vacuum to the chamber to create evacuated pores in the porous carbon material;
delivering one or more precursors to impregnate the evacuated pores in the porous carbon material, the one or more precursors comprising platinum, nickel, and copper;
purging the chamber using a purge gas;
heating the porous carbon material to a functional temperature; and
delivering a functional gas into the chamber and to the porous carbon material, the one or more precursors reacting with the functional gas to form platinum alloy particles within the pores of the porous carbon material.

10. The method of claim 9, comprising delivering the one or more precursors with agitation.

11. The method of claim 9, wherein removing moisture comprises heating the porous carbon material to a first temperature in a controlled atmosphere comprising air, Ar, $N_2$, $O_2$, or combinations thereof.

12. The method of claim 9, wherein applying the vacuum creates a pressure within the chamber of less than 500 millibars.

13. The method of claim 9, comprising maintaining the vacuum during the purging of the chamber.

14. The method of claim 9, wherein the functional gas is a gas mixture comprising $H_2$ and CO.

15. The method of claim 14, comprising delivering the functional gas at a partial pressure ratio of from 1:100 to 1:1 of $H_2$ to CO, and a volumetric flow rate of from 10 sccm to 1000 sccm.

16. The method of claim 9, wherein the functional temperature is from 150° C. to 300° C.

17. The method of claim 16, further comprising maintaining the functional temperature for a time period of from 1 hour to 5 hours in the presence of the functional gas.

18. A method for forming platinum alloy particles within pores of a porous carbon material, the method comprising:
heating a porous carbon material in a chamber to a temperature of from 150° C. to 300° C., for a time period of from 1 hour to 24 hours, in an atmosphere comprising air, Ar, $N_2$, $O_2$, or combinations thereof;
reducing pressure within the chamber to less than 500 millibars to create evacuated pores in the porous carbon material;
delivering one or more precursors to the evacuated pores in the porous carbon material, the one or more precursors comprising platinum(acac)$_2$, copper(acac)$_2$, and nickel(acac)$_2$, the one or more precursors being dissolved in a volatile solvent;
purging the chamber using a purge gas;
heating the porous carbon material to a temperature from 150° C. to 300° C. for a period of from 1 hour to 5 hours; and
delivering a functional gas into the chamber and to the porous carbon material, the one or more precursors reacting with the functional gas to form platinum alloy within the pores of the porous carbon material.

19. The method of claim 18, wherein the functional gas comprises $H_2$ and CO, delivered at a partial pressure ratio of from 1:100 to 1:1 of $H_2$ to CO, and a volumetric flow rate of from 10 sccm to 1000 sccm.

* * * * *

UNITED STATES PATENT AND TRADEMARK OFFICE
CERTIFICATE OF CORRECTION

PATENT NO.       : 10,875,015 B2
APPLICATION NO.  : 16/139936
DATED            : December 29, 2020
INVENTOR(S)      : Xiaochen Shen et al.

Page 1 of 1

It is certified that error appears in the above-identified patent and that said Letters Patent is hereby corrected as shown below:

In the Claims

Claim 8, Column 11, Lines 63-64, "of the functional gas of a functional gas" should be -- of a functional gas --

Signed and Sealed this
Sixth Day of April, 2021

Drew Hirshfeld
*Performing the Functions and Duties of the
Under Secretary of Commerce for Intellectual Property and
Director of the United States Patent and Trademark Office*